Patented July 7, 1931

1,813,345

UNITED STATES PATENT OFFICE

IRA H. DERBY AND ORIN D. CUNNINGHAM, OF INDIANAPOLIS, INDIANA, ASSIGNORS TO PETER C. REILLY, OF INDIANAPOLIS, INDIANA

PROCESS OF ORE FLOTATION

No Drawing.  Application filed September 17, 1930. Serial No. 482,643.

The present invention relates to improvements in ore flotation, including the flotation of sulfide ores, and other metalliferous material, by the use of "nuclear phosphorus compounds" containing sulfur, that is, compounds structurally consisting of groups of atoms (or radicals) united to one or more phosphorus atoms as a nucleus, which compounds also contain sulfur. The invention is based upon our observation that certain compounds as described herein which structurally consist of phosphorus as a nucleus to which other groups of atoms (radicals) are attached, and which contain sulfur, are excellent flotation agents and constitute a class of compounds that have not heretofore been used in the art of flotation.

The present application is a continuation in part of our copending case Serial Number 96,061, filed March 19, 1926.

More particularly, our present invention embraces ore flotation while using reagents containing products of reaction of phosphorus sulfides (such as the trisulfide, $P_2S_3$, or pentasulfide, $P_2S_5$), with a pyridine base alone, or preferably a pyridine base and a suitable organic solvent, and the use of such substances in ore flotation. For example, the reaction of $P_2S_5$ with the coal tar bases pyridine, quinolin, etc. (or mixtures thereof) or preferably the mixed coal tar bases obtained by the extraction of coal tar oils, dissolved preferably in a suitable solvent such as an aliphatic alcohol (ethyl alcohol, for example) or a phenolic substance (for example, a tar acid).

The reactions of the phosphorus sulfides, for example, phosphorus pentasulfide, $P_2S_5$, with pyridine bases (with or without a suitable organic solvent, may result in the formation of a single chemical substance of acidic nature, with two or more phosphorus atoms as a nucleus of the molecular structure; or there may be a splitting of the molecule of the phosphorus sulfide compound to yield two or more products each containing one or more nuclear phosphorus atoms; or the reaction may or may not involve the elimination of some of the sulfur of the phosphorus sulfide in the form of hydrogen sulfide by the substitution of groups of atoms (radicals), the resulting product or products being characterized, however, by the presence of a nuclear phosphorus atom or atoms in the molecular structure and the presence of sulfur in combination.

These substances have a very high selective action or collecting power for metalliferous materials, such as sulfide minerals, in mineral flotation operations but are somewhat lacking in frothing properties, so that any appropriate frothing agent (such, for example, as pine oil or tar acids), should be employed in conjunction therewith in carrying out the flotation operation.

It is not necessary that chemically pure substances be used since the unrefined products can be employed with metallurgical results equally good to those obtained with pure substances. For example, we may use the crude pyridine bases extractable from coal tar oils.

The phosphosulfo compounds above referred to can be used either alone or mixed with other oily materials having flotation value, or with solvent agents or mixtures of the same.

For the preparation of the phospho-sulpho compounds of the present invention we give the following specific examples:

*Example #1.*—A suitable amount, say 2 parts, of $P_2S_5$ was reacted with 10 parts of an anhydrous crude coal tar pyridine base extract of a coal tar oil at 125° C. or thereabout, the $P_2S_5$ being added slowly and the reaction mixture being stirred continuously. The reaction was continued until there was a complete disappearance of the $P_2S_5$ and a homogeneous liquid product was obtained.

*Example #2.*—A suitable amount, say 2 parts, of $P_2S_5$ was reacted with 5 parts of an anhydrous crude coal tar pyridine base extract of a coal tar oil dissolved in 5 parts of absolute ethyl alcohol as a solvent at 100° C., or thereabout, the $P_2S_5$ being added slowly and the reaction mixture being stirred continuously. The reaction was continued until there was a complete disappearance of the $P_2S_5$ and a homogeneous liquid product was obtained.

Instead of the temperatures used above, the reactions can be carried out at 25° C. or thereabout. Nor do we limit ourselves to the above reacting proportions.

Instead of a coal tar pyridine base extract any of the coal tar pyridine base constituents thereof may be employed, such as, for example, pyridine, quinolin, etc.; and in place of alcohol as a solvent tar acids or a tar acid constituent may be used equally well. It is preferable to use anhydrous materials.

The general procedure indicated in the above example may be applied in chemically combining phosphorus pentasulfide with any coal tar pyridine bases (with or without a suitable organic solvent). In some instances heat may have to be applied to bring about the desired chemical combination, and in other cases the reaction mixture may desirably be cooled to carry on the reaction in the cold.

Without limiting the present invention to any theory of reaction, it is believed that the reaction product according to the present invention, of which the above examples are illustrative, may be described as pyridine base salts of organic thiophosphoric acid compounds.

The product obtained by the reaction of the organic nitrogenous base aniline with phosphorus pentasulfide, as illustrated in the above example, was employed in the flotation of a copper sulfide ore slime of the Utah Copper Company containing some copper oxides and analyzing about 0.9% copper, in the ratio of one tenth pound of product per ton of dry ore, and tar acids as a frothing agent, a lime circuit being employed in conjunction therewith. The ore was subjected to the ordinary flotation operation in a mechanical agitation type of flotation machine and a tailing analyzing 0.06% copper was obtained, together with a high grade concentrate analyzing about 20% copper, corresponding to a recovery of about 95% of the copper value in the ore under treatment.

In other examples we have used both smaller and larger amounts of the nitrogenous phosphosulfo compounds, in the flotation of ores, with satisfactory results, and we have also used the nitrogenous phosphosulfo compounds both alone and with other flotation agents, with very satisfactory results. Furthermore, we do not limit out conditions for carrying out a flotation operation to those included in the above examples, but may use any type of flotation machine, as for example, the Callow cell, or instead of an alkaline circuit, we may use a normal or acid circuit.

We have specified the use of an aliphatic alcohol and have given ethyl alcohol in the preparation of the flotation reagent of the present invention. It is understood that other monohydroxy aliphatic alcohols may be employed with equally good results, such as methyl alcohol, the propyl alcohols, the butyl alcohols, the amyl alcohols, the hexyl alcohols, as well as mixtures of the same.

By the term "phenolic substance" we mean those substances which naturally occur in coal tar oils, such as phenol, the cresols, the xylenols, etc. or mixtures of the same (called tar acids).

By the term "coal tar pyridine base extracts" we mean the mixed bases obtainable by the extraction of coal tar oils or fractions thereof obtainable by distillation.

What we claim is:

1. In the art of froth flotation the step of floating material to be concentrated in the presence of the herein described flotation agent which comprises a reaction product of a phosphorous sulfur compound with a coal tar pyridine base extract.

2. In the art of froth flotation the step of floating material to be concentrated in the presence of the herein described flotation agent which comprises a reaction product of a phosphorous sulfur compound with a coal tar pyridine base extract dissolved in suitable organic solvent.

3. In the art of froth flotation the step of floating material to be concentrated in the presence of the herein described flotation agent which comprises a reaction product of a phosphorous sulfur compound with a coal tar pyridine base extract and an aliphatic alcohol as a solvent.

4. In the art of froth flotation the step of floating material to be concentrated in the presence of the herein described flotation agent which comprises a reaction product of a phosphorous sulfur compound with a coal tar pyridine base extract and ethyl alcohol.

5. In the art of froth flotation the step of floating material to be concentrated in the presence of the herein described flotation agent which comprises a reaction product of a phosphorous sulfur compound with a coal tar pyridine base extract and amyl alcohol.

6. In the art of froth flotation the step of floating material to be concentrated in the presence of the herein described flotation agent which comprises a reaction product of a phosphorous sulfur compound with a coal tar pyridine base extract and a phenolic compound as a solvent.

7. In the art of froth flotation the step of floating material to be concentrated in the presence of the herein described flotation agent which comprises a reaction of phosphorous sulfur compound with a coal tar pyridine base extract and a tar acid.

8. An agent for use in flotation comprising the reaction product of a phosphorous sulfide, a coal tar pyridine base extract and an alcohol.

9. An agent for use in flotation comprising the reaction product of a phosphorous sulfide, a coal tar pyridine base extract and a phenolic compound.

10. A process which comprises reacting with a phosphorous sulfide on a coal tar pyridine base extract in the presence of an organic solvent selected from the herein described group consisting of an aliphatic alcohol or a phenolic body to form a reaction product of flotation value which may be described as a pyridine base salt of an organic thiophosphoric acid compound.

In testimony whereof we have signed our names to this specification.

IRA H. DERBY.
ORIN D. CUNNINGHAM.